United States Patent
Hulten

(10) Patent No.: US 6,371,258 B1
(45) Date of Patent: Apr. 16, 2002

(54) MEANS FOR CARRYING A FRICTION PAD

(75) Inventor: Johan Hulten, Gothenburg (SE)

(73) Assignee: AB Volvo (SE)

( * ) Notice: Subject to any disclaimer, the term of this patent is extended or adjusted under 35 U.S.C. 154(b) by 0 days.

(21) Appl. No.: 09/011,663

(22) PCT Filed: Jun. 28, 1996

(86) PCT No.: PCT/SE96/00869

§ 371 Date: May 6, 1998

§ 102(e) Date: May 6, 1998

(87) PCT Pub. No.: WO97/07345

PCT Pub. Date: Feb. 27, 1997

(30) Foreign Application Priority Data

Aug. 16, 1995 (SE) .............................................. 9502858

(51) Int. Cl.⁷ .............................................. F16D 55/00
(52) U.S. Cl. ................. 188/73.31; 188/250 E; 188/253
(58) Field of Search .................. 188/73.31, 250 G, 188/250 H, 250 E, 73.37, 252, 253, 250 B, 250 A, 250 D

(56) References Cited

U.S. PATENT DOCUMENTS

| | | | |
|---|---|---|---|
| 5,499,705 A | * | 3/1996 | Ide ........................ 188/250 B |
| 5,887,686 A | * | 3/1999 | Tanaka et al. .......... 188/250 E |
| 5,971,112 A | * | 10/1999 | Okada et al. ........... 188/250 B |

FOREIGN PATENT DOCUMENTS

| | | |
|---|---|---|
| DE | 3140918 | 11/1983 |
| EP | 0331532 | 9/1989 |
| EP | 0353857 | 2/1990 |
| FR | 2235310 | 1/1975 |
| GB | 21433916 | 2/1985 |

OTHER PUBLICATIONS

Patent Abstracts of Japan, vol. 10, No. 227, M–505, abstract of JP, A, 61–62627 (Matsushita Electric Ind Co Ltd), Mar. 31, 1986.

* cited by examiner

Primary Examiner—Christopher P. Schwartz
Assistant Examiner—Melanie Torres
(74) Attorney, Agent, or Firm—Kilpatrick Stockton LLP

(57) ABSTRACT

The invention concerns a means (12) for carrying a friction pad (13), which is a part of a system for retarding rotational movement, e.g. at a rotating shaft. The carrier means (12) is intended for distributing the press force from a brake mechanism via a contact surface to the friction pad (13) mounted upon said means (12). In its active position, the pad cooperates with the surface (10, 18) connected to the object of rotation wherein the carrier means (12) with the friction pad (13) is oriented extending along a sector of the rotation diameter of the contact surface. The carrier means (12) is so designed that the value of the local natural angle frequency varies between one end of said sector of the rotation diameter of the contact surface and the other end of said sector.

19 Claims, 7 Drawing Sheets

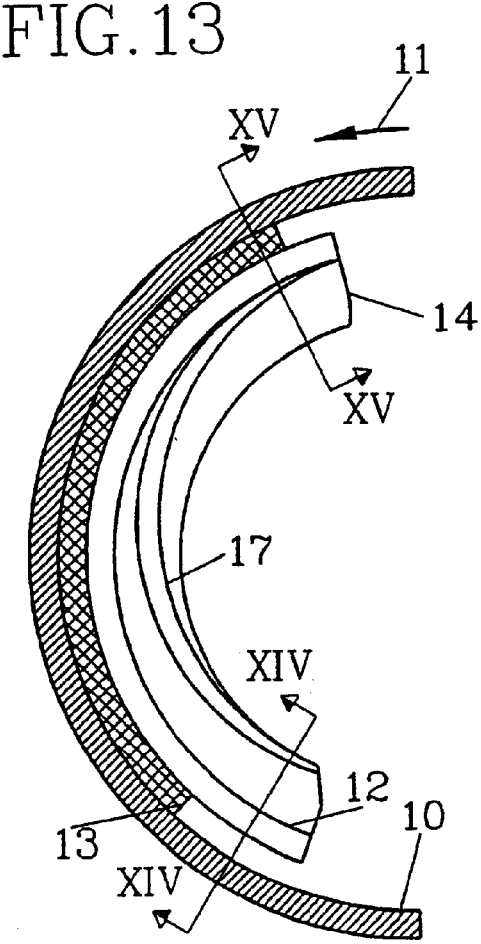
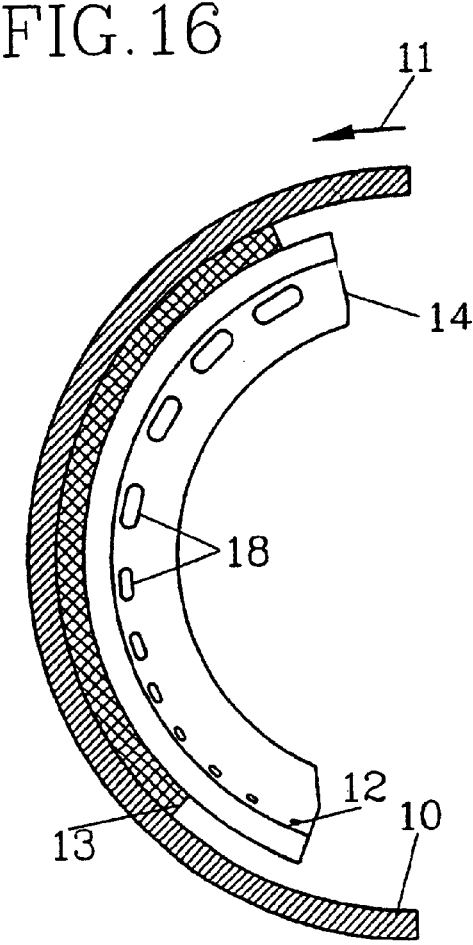
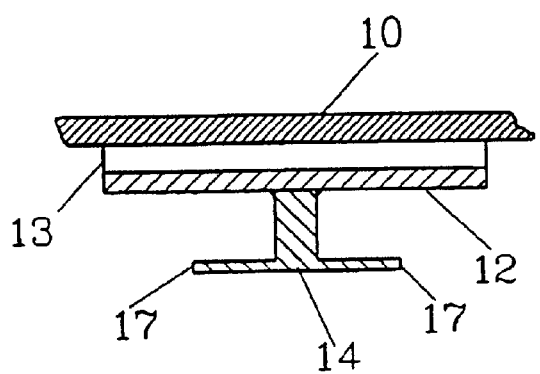
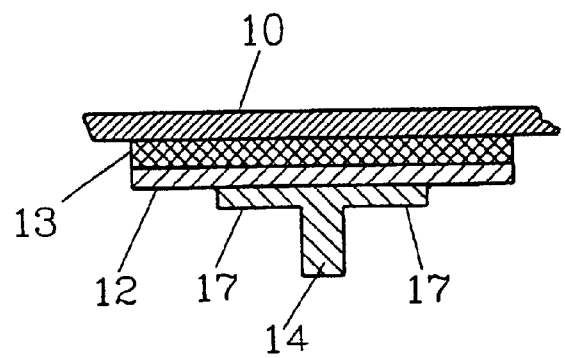

MEANS FOR CARRYING A FRICTION PAD

FIELD OF THE INVENTION

The present invention refers to a device or means for carrying a friction pad, which is a part of a system for retarding rotational movement, e.g. at a rotating shaft, said carrier means being intended for distributing the press force from a brake mechanism via a contact surface to the friction pad mounted upon said means, which in its active position cooperates with a surface connected to the object of rotation wherein the carrier means with the friction pad is oriented extending along a sector of the rotation diameter of the contact surface.

BACKGROUND OF THE INVENTION

Sometimes, a so called brake squeal occurs when a vehicle is retarded or braked, a phenomenon which occurs both in disc and drum brakes. Typical frequencies for this noise lies in the area of some kHz, and within the sensitivity range of the human hearing. It is true that the noise which is generated decreases with the distance from the source of the noise, but the noise may amount to about 140 dB close to the brake. Especially disturbing are town busses stopping at short intervals within densely populated regions. Brake squeal is a common cause of complaint regarding new cars, trucks and busses. Even if brake squeal does not affect the efficiency of the brakes and the security, the problem is regardless very large and has to be solved. The problem also occurs on vehicles having so called ABS-brakes.

Many analyses of the problem of brake squeal has been made, and many solutions have been tested. For example, tests have been made where the components of a brake system have been enlarged in order to get a different natural oscillation.

This has led to increasing costs, without getting any guarantee for not getting the brake squeal phenomenon under certain circumstances.

Further, GB 2143916 shows a disc brake pad with a back plate for a friction pad which varies in thickness along a line in the direction of rotation. This means that the thickness of the pads varies in the direction of rotation, which leads to negative consequences. For example, the life expectancy is reduced because the entire pad volume may not be used. Besides, the wear will be larger on one side, which will be the cause of local increases in temperature with thermal stress, which in the worst case will cause formation of cracks in the drum or the disc, perhaps leading to breakdown. Further, an unfavourable distribution of friction between different brakes may lead to the brakes pulling sideways, i.e. a brake fault which affects the steering. Also, there is a risk for shearing off the brake pad, which may lead to a total loss of braking power or to locking of some wheel.

It is obvious that no measure which is intended to reduce the problem of brake squeal, may lead to a reduction of break efficiency.

THE TECHNICAL PROBLEM

One object of the present invention is therefore to provide a carrier means for a friction pad, which in a simple and efficient way eliminates the problem of brake squeal, without decreasing the efficiency of the brakes.

THE SOLUTION

For this object, the invention is characterized in that the carrier device is so designed that the value of the local natural angle frequency varies between a front end of said sector portion of the carrier device delineated along the rotation diameter of the contact surface and a back end of said sector portion of the carrier device.

This can be achieved in that either the back plate or the spar web, or both these elements are designed for varied natural angle frequency.

Advantageous variants for providing such variations are illustrated by the following subclaims.

The background to the expression local natural angle frequency.

Instable oscillations (self-oscillation) are by nature wave motion. Wave velocity for bending waves are proportional to the square root of the quotient between the bending stiffness, $EI(\phi)$ and the distribution of mass, $m(\phi)$, according to:

$$v \sim \sqrt{\frac{EI(\varphi)}{m(\varphi)}}$$

The natural angle frequency is proportional to the square root of the quotient between the bending stiffness, EI, and the mass, M according to:

$$\bar{\omega} \sim \sqrt{\frac{EI}{M}}$$

Let us therefore define "local natural angle frequency", $\omega_1(\phi)$ $$\bar{\omega}_1(\varphi) = \sqrt{\frac{EI(\varphi)}{m(\varphi)}}$$

so that $$v \sim \omega_1(\phi).$$

The distribution of mass, $m(\phi)$, has the unit kg/m and is the product of cross sectional area, A, and density, $\zeta$, according to $$m(\phi) = A(\phi) \cdot \zeta(\phi)$$

i.e.

$$m(\phi) \sim A(\phi).$$

The history of a brake pad (that is to say the wear that the brake pad has been subjected to during its life time) has a large significance upon the distribution of pressure which the brake pad exerts upon the drum. Also brake pressure and generation of heat during braking has a great influence upon the distribution of pressure. The different distributions of pressure makes different parts of the brake shoe active at different times. If the pressure is large at the sides of the shoe, the carrier plate for the pad, the back plate, is more active than the spar web. If the pressure is substantially located to the middle of the brake shoe, the spar web is more active than the back plate. Accordingly, the natural angle frequency is varied in the carrier device by special design of either the back plate or the spar web, or by designing these two elements for varied natural angle frequency.

Analysis of drum brakes has also shown that unstable oscillations in that area of frequency where brake squeal occurs must contain wave movement. If this wave movement is prevented, instability is reduced. It is known that a part of a wave is reflected when transiting into local natural angle frequency. When a wave is reflected in this way, a standing wave is created together with a reduced moving wave before the point of reflection and a reduced moving wave after the point of reflection. Thus, the reflection results in a decreasing moving wave. Because of this, instability is also reduced.

Transitions in local natural angle frequency may for example be provided by step-by-step alterations. One step is here defined by that the local natural angle frequency for the section cuts the local natural angle frequency mean value for the entire section portion of the carrier means, in such a way, that the received step lengths, 1, meet the condition 1>3t where t is the mean thickness value of the spar web.

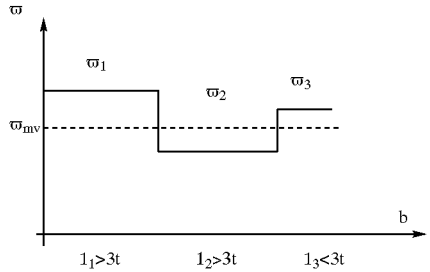

If the local natural angle frequency of the carrier means is not altered in the form of a step, the maximum-/minimum values shall be used within each step length according to the definition.

Both during continual and step-by-step alteration between two adjacent steps is applicable:

$$\frac{\overline{\omega}_i}{\overline{\omega}_{i+1}} < q \quad \text{or} \quad \frac{\overline{\omega}_i}{\overline{\omega}_{i+1}} > \frac{1}{q}$$

where $\omega_i$ and $_i\omega_l$ are two adjacent local natural angle frequencies or two local natural angle end frequencies.

The brake shoe is divided into the segments A=back plate, B=spar web and AB=the total section.

For these segments shall be applicable:

$$q_A < 0,7 q_B < 0,7 q_{AB} < 0,8$$

DESCRIPTION OF THE DRAWINGS

The invention will be described hereinafter with reference to embodiments that are shown in the enclosed drawings, wherein FIG. 13 shows in a corresponding way as FIG. 1 a drum brake shoe according to a fifth embodiment of the invention, FIG. 14 is a section along the line XIV—XIV in FIG. 13, FIG. 15 is a section along the line XV—XV in FIG. 13, FIG. 16 shows in a corresponding way as FIG. 1 a drum brake shoe according to a sixth embodiment of the invention.

MODE(S) FOR CARRYING OUT THE INVENTION

Figure 1:
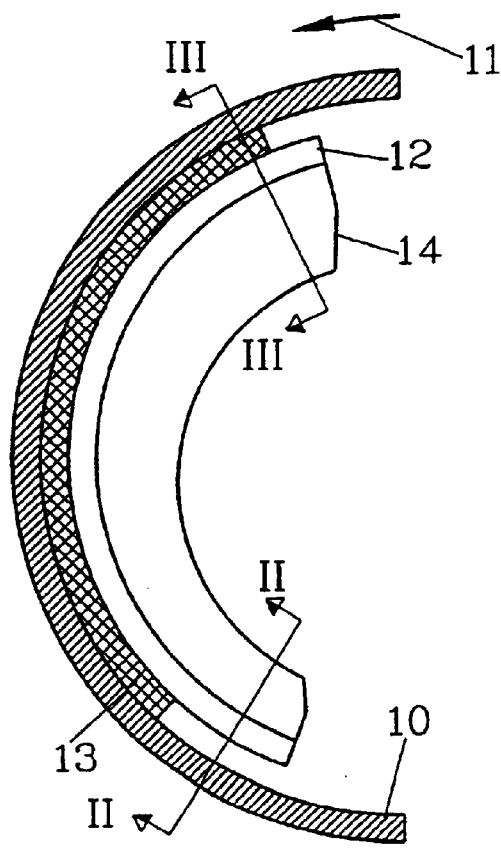
FIG. 1 shows parts of a drum brake with a shoe according to a first embodiment of the invention, in view from the side.

In FIG. 1 a part of a drum brake is shown with the drum 10, which rotates in the direction of the arrow 11 and with a brake shoe which forms a carrier device for a pad 13. The shoe mediates the force from a not shown hydraulic or mechanic brake mechanism to the pad 13 and is provided with a spar web 14 which is directed substantially perpendicular out from the reverse side from a contact surface of a back plate which carries the friction pad 13.

The shoe is designed in a conventional way with the friction pad 13 oriented so that it extends along a sector portion of the carrier device defined along a rotation diameter of the contact surface of the backplate 12.

Experiments have shown that it is possible to eliminate brake squeal at such a drum brake by designing the carrier device so that the value of the local natural angle frequency which is proportional to the square root of the quotient between the bending stiffness and the mass, increases from a first value at one end of said sector portion of the carrier device defined along a rotation diameter of the contact surface to a second value at the other end of the sector portion.

Figure 2:
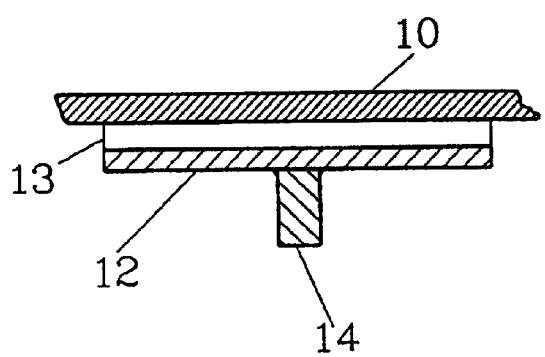
FIG. 2 is a section along the line II—II in FIG. 1.
Figure 3:
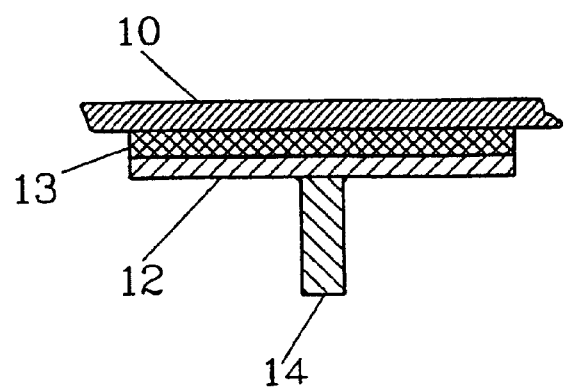
FIG. 3 is a section along the line III—III in FIG. 1.

As is illustrated by FIGS. 2 and 3, the height of the spar web 14 varies from a large dimension adjacent the normal front edge of the friction pad 13 which corresponds to a front edge of the sector portion of the carrier device, to a small dimension adjacent the normal back edge of the friction pad which corresponds to a back edge of the sector portion of the carrier device, according to the rotation direction defined by the arrow 11. By this design of the spar web 14 both the bending stiffness as well as the distribution of mass is affected along the above described sector, the carrier device thereby providing altered natural angle frequency along the sector.

Figure 4:
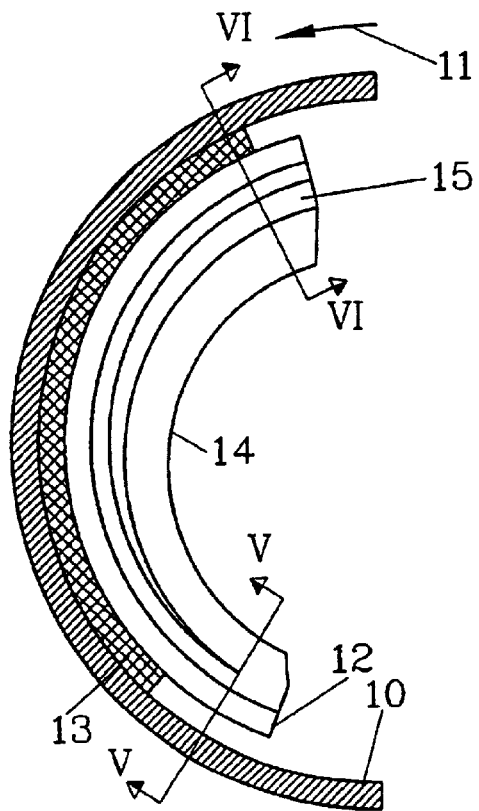
FIG. 4 shows in a corresponding way as FIG. 1 a drum brake shoe according to a second embodiment of the invention.
Figure 5:
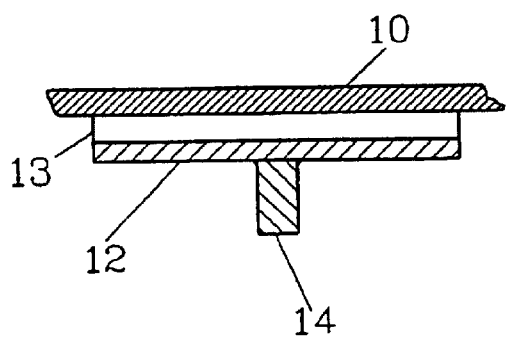
FIG. 5 is a section along the line V—V in FIG. 4.
Figure 6:
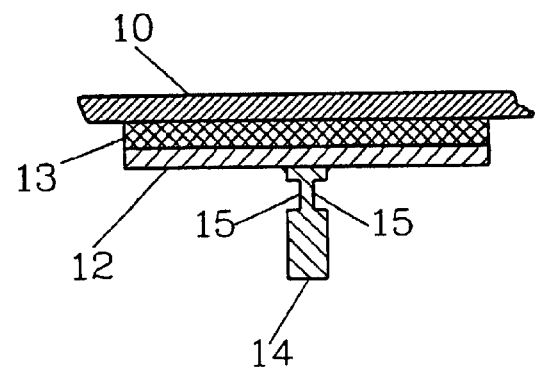
FIG. 6 is a section along the line VI—VI in FIG. 4.
Figure 7:
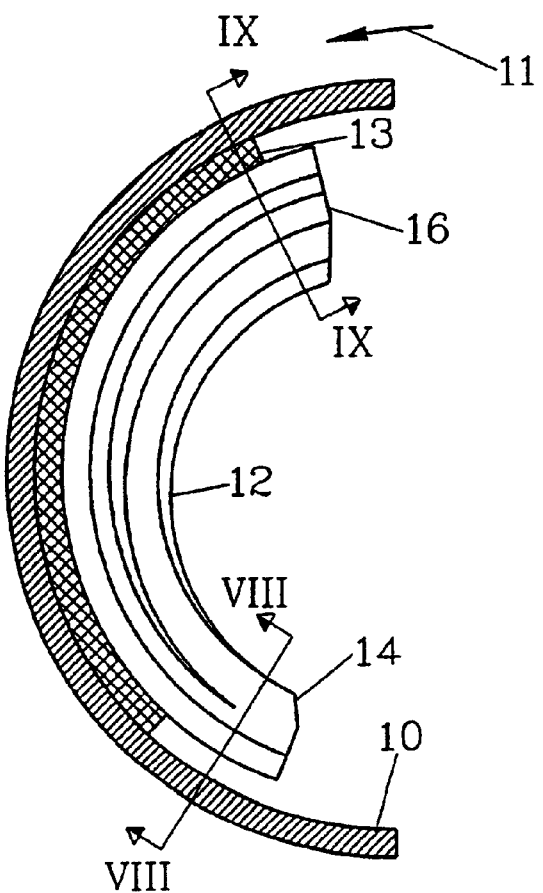
FIG. 7 shows in a corresponding way as FIG. 1 a drum brake shoe according to a third embodiment of the invention.
Figure 8:
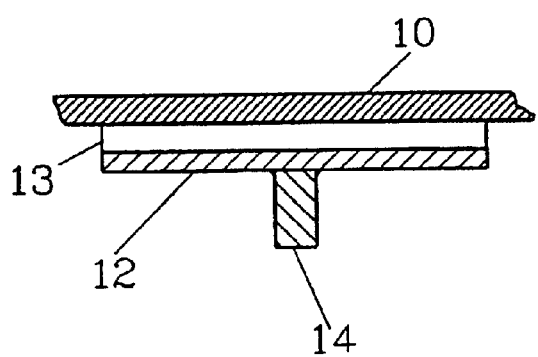
FIG. 8 is a section along the line VIII—VIII in FIG. 7.
Figure 9:
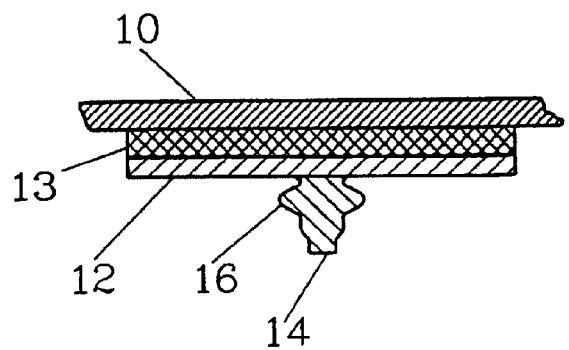
FIG. 9 is a section along the line IX—IX in FIG. 7.

FIGS. 4 to 6 shows a second embodiment of the invention, where the spar web height varies in the same way as in the preceding embodiment, but with a constant or slightly varied distribution of mass caused by a slot 15 which has been milled into each side of the spar web 14. In this way, a greater difference in natural angle frequency is achieved than in comparison with the embodiment shown in FIGS. 1 to 3. FIGS. 7 to 9 shows a third variant of the invention where the spar web height and the bending stiffness remains substantually constant. On the other hand, mass distribution is varied in that the spar web is provided with a waist 16 which increases gradually i volume along the above mentioned sector portion of the carrier device.

Figure 10:
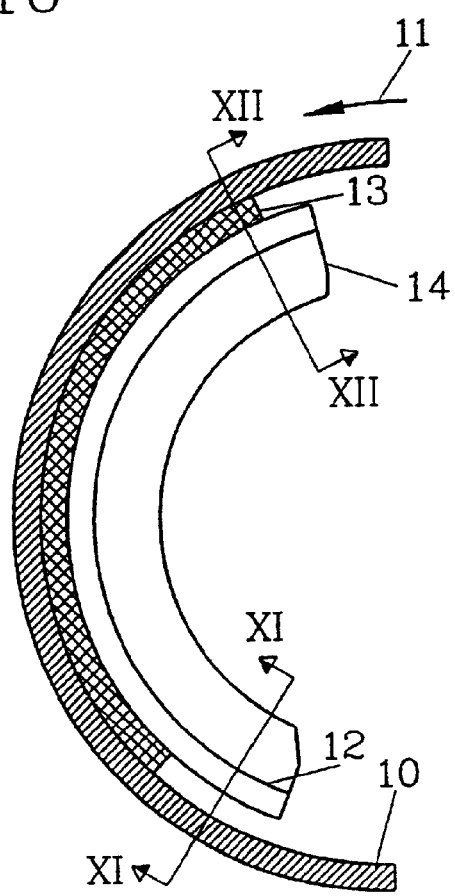
FIG. 10 shows in a corresponding way as FIG. 1 a drum brake shoe according to a fourth embodiment of the invention.
Figure 11:
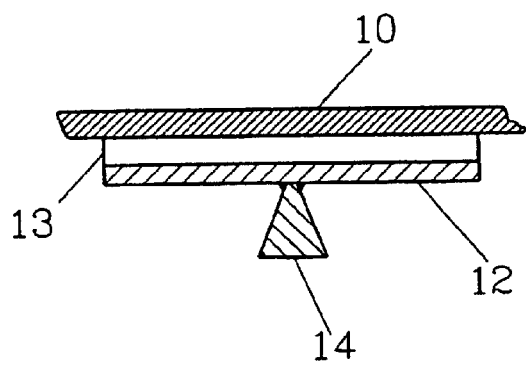
FIG. 11 is a section along the line XI—XI in FIG. 10.
Figure 12:
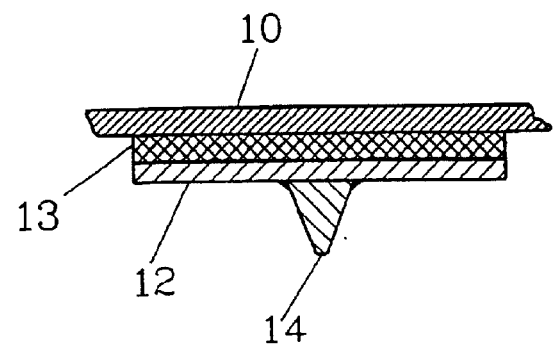
FIG. 12 is a section along the line XII—XII in FIG. 10.

FIGS. 10 to 12 shows a fourth embodiment of the invention where distribution of mass and spare web height is constant, but bending stiffness is varied along the sector length, by gradually increasing the width of the spar web 14 along the edge which abuts the reverse side of the surface which carries the friction pad while at the same time decreasing it along the opposite edge.

FIGS. 13 to 15 shows a fifth variant of the invention where the spar web height is constant, but both bending stiffness and mass distribution is varied along the length of the sector portion. This is achieved by providing the spar web 14 with one or more angle flanges 17 extending along said sector portion which gradually increase thickness along the sector portion while at the same time, the distance between the flange 17 and the reverse side of the back plate from the contact surface which carries the friction pad decreases gradually in the same direction along the sector portion of the carrier device. This means that mass increases in one direction, while the bending stiffness increases in the other direction.

FIG. 16 shows still another embodiment, where the spar web 14 is provided with apertures 18 with gradually increasing size along the sector portion length. This means that mass increases in one direction, without appreciably affecting the bending stiffness. The apertures 18 may be configured as ovals, as shown, or round. The oval apertures may vary in size, either only with regard to length, or both with regard to length and width.

Figure 17:
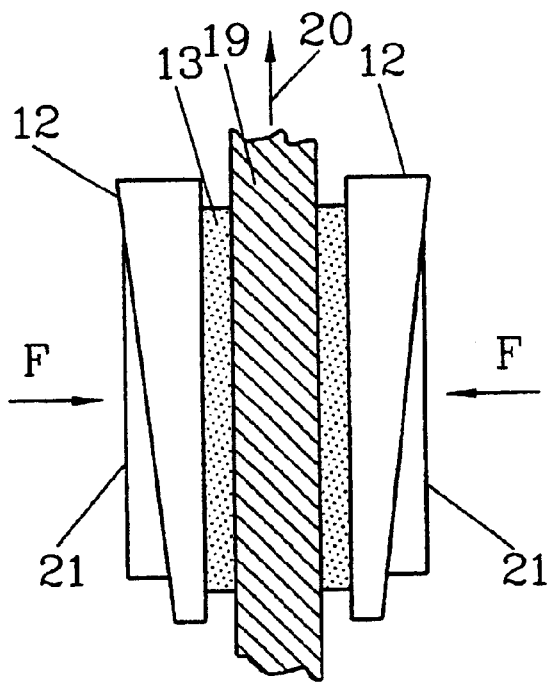
FIG. 17 shows a disc brake provided with back plates in accordance with the invention.
Figure 18:
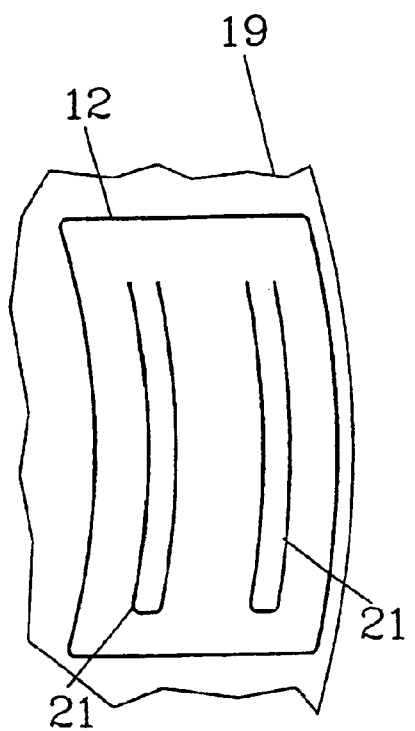
FIG. 18 shows the disc brake in a plane view.

The disc brake shown in FIG. 17 and FIG. 18 comprises a disc 19 which normally rotates in the rotation direction defined by the arrow 20. The back plates 12 carrying the pads 13 are wedge-shaped in such a way, that the bending stiffness varies continuously along a sector portion of the surface which carries the pad, without affecting the actual volume of the pad. The plates 12 are provided with flanges 21 which are inversely wedge-shaped towards the back plates 12, so that the back sides of the plates are parallel with the pad side.

Figure 19:
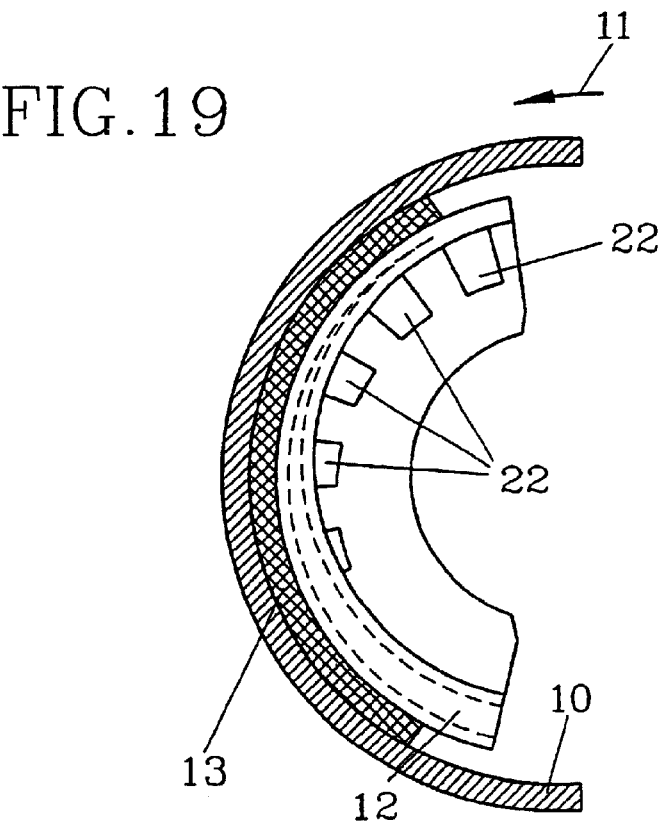
FIG. 19 shows a drum brake shoe according to a seventh embodiment of the invention.
Figure 20:
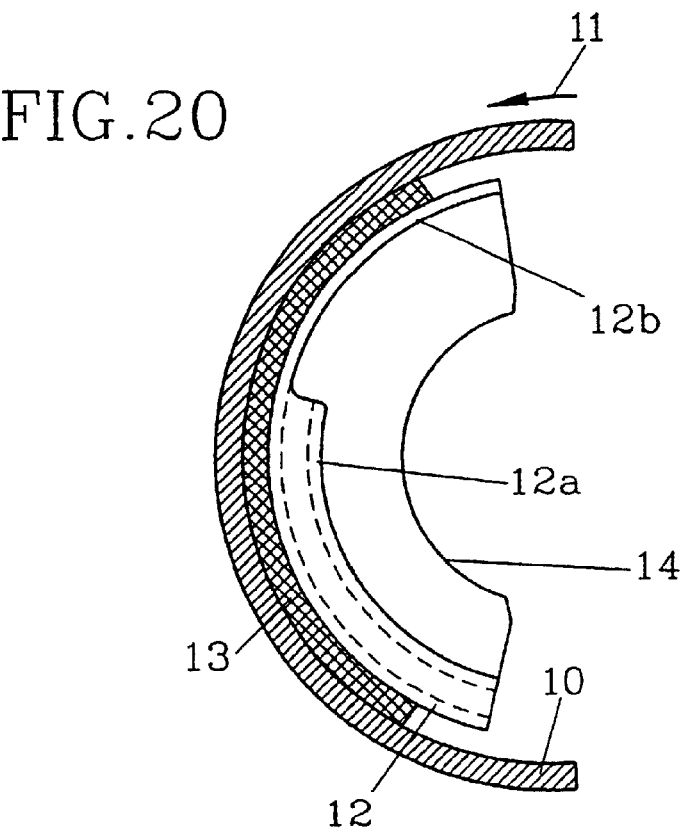
FIG. 20 shows a drum brake shoe according to an eighth embodiment of the invention.

FIGS. 19 and 20 shows two further embodiments of drum brake shoes, of which FIG. 19 shows a drum brake shoe the back plate 12 of which is designed as a tubular beam having a continuously narrowing section. A number of local masses 22 are attached to this back plate 12. The design according to this embodiment provides both altered bending stiffness and altered mass along the brake sector portion of the shoe.

FIG. 20 illustrates a drum brake shoe with a back plate that has been made in two steps 12a, 12b, which provides a step-by-step altering of the bending stiffness along the brake shoe. This step-by-step alteration also causes a change in the natural angle frequency, which reduces the occurrence of brake squeal.

Naturally, the invention is not limited to the above described embodiments, instead more variants are conceivable within the scope of the following claims. Naturally, other designs for carrier devices or means may be used for varying bending stiffness and mass distribution. For example, the back plate of the carrier means may be designed so that the natural angle frequency is altered by varying bending stiffness along the bow length of the back plate. Alternatively, the local natural angle frequency of the back plate may be altered by varying the mass along the length of arc of the back plate. Naturally, both bending stiffness and mass may vary along the length of arc of the back plate. In all cases, the above described variations in bending stiffness and mass may vary gradually or step-by-step.

What is claimed is:

1. A carrier device for a friction pad that is utilized in a braking assembly for retarding rotational motion of a rotating object, said carrier device comprising:

a carrier body adapted to be coupled to a brake actuating mechanism for pressing said carrier body toward a rotating object, said carrier body having a sector portion configured to span a circumferential portion of the rotating object when positioned adjacent thereto, said sector portion having a front end adapted to be positioned toward oncoming rotation of the rotating object and a back end positioned opposite said front end on said sector portion;

said carrier body being configured so that the value of the local natural angle frequency varies between said front end and said back end of said sector portion for avoiding brake squeal;

a brake shoe formed at a front side of said carrier body, said brake shoe having a contact surface configured to receivably engage a friction pad that is adapted for repeated engagement with the rotating object;

a spar web formed at a back side of said brake shoe and extending away therefrom; and a bending stiffness along said sector portion of said carrier body being varied for causing said varied local natural angle frequency between said front end and said back end of said sector portion of said carrier body for avoiding brake squeal;

wherein said carrier device has a substantially constant mass distribution along said sector portion of said carrier body.

2. The carrier device as recited in claim 1, wherein said sector portion of said carrier body is substantially T-shaped in lateral cross-section along a substantial entirety of a length of said sector portion, and said brake shoe forming a top cross-member of said substantially T-shaped cross-section and said spar web forming a substantially upright member of said substantially T-shaped cross-section.

3. The carrier device as recited in claim 2, wherein said spar web forming said substantially upright member of said substantially T-shaped cross-section has a varying height along said length of said sector portion of said carrier body, said varying height of said spar web causing said variable bending stiffness of said sector portion of said carrier body.

4. The carrier device as recited in claim 2, said carrier device further comprising:

a slot milled into at least one side of said substantially upright member of said spar web for maintaining said substantially constant mass distribution along said sector portion of said carrier body.

5. The carrier device as recited in claim 2, said carrier device further comprising:

two slots milled, one each into opposite sides of said substantially upright member of said spar web for maintaining said substantially constant mass distribution along said sector portion of said carrier body.

6. The carrier device as recited in claim 5, wherein a cross-sectional area of each of said two slots increases from a narrow end to an expanded end thereof for maintaining said substantially constant mass distribution along said sector portion of said carrier body.

7. The carrier device as recited in claim 5, wherein said two slots are opposingly positioned, one to the other, with one of said two slots recessed into each of said two opposite sides of said substantially upright member of said spar web thereby forming a narrowed neck portion in said spar web between said two slots.

8. The carrier device as recited in claim 4, wherein a cross-sectional area of said slot increases from a narrow end to an expanded end thereof for maintaining said substantially constant mass distribution along said sector portion of said carrier body.

9. The carrier device as recited in claim 5, wherein a length of said slot between said narrow end and said expanded end thereof extends across a majority of said length of said sector portion.

10. The carrier device as recited in claim 8, wherein a length of said slot between said narrow end and said expanded end thereof extends across less than an entirety of said length of said sector portion.

11. A carrier device for carrying a friction pad which is part of a system for retarding rotational movement of an object of rotation, said carrier device being intended for distributing a press force from a brake mechanism via a contact surface of said carrier device to a friction pad mounted upon said carrier device, the friction pad in its active position cooperating with a surface connected to the object of rotation, comprising:
   a sector portion extending at least partially along a rotation diameter of said contact surface and at least partially adjacent to the friction pad;
   wherein said carrier device is configured so that the value of the local natural angle frequency varies between front and back ends of said sector portion;
   wherein said value of the local natural angle frequency is varied as a result of a variable bending stiffness along said sector portion;
   wherein said variable bending stiffness along said sector portion is a result of one or more spar webs having a variable height; and
   wherein a mass distribution of said carrier device is substantially constant along said sector portion.

12. The carrier device as recited in claim 11 further comprising:
   at least one spar web extending along said sector portion and being oriented substantially perpendicularly away from a reverse side of said contact surface.

13. The carrier device as recited in claim 11 further comprising:
   at least one aperture through said spar web for maintaining said substantially constant mass distribution of said carrier device along said sector portion.

14. The carrier device as recited in claim 11 further comprising:
   a plurality of apertures through said spar web for maintaining said substantially constant mass distribution of said carrier device along said sector portion.

15. The carrier device as recited in claim 14 wherein said plurality of apertures are arranged to have successively increasing sizes along said spar web for maintaining said substantially constant mass distribution of said carrier device along said sector portion.

16. The carrier device as recited in claim 11 wherein said variable bending stiffness along said sector portion is a result of a variable width of said spar web.

17. A carrier device for carrying a friction pad which is part of a system for retarding rotational movement of an object of rotation, said carrier device being intended for distributing a press force from a brake mechanism via a contact surface of said carrier device to a friction pad mounted upon said carrier device, the friction pad in its active position cooperating with a surface connected to the object of rotation, comprising:
   a sector portion extending at least partially along a rotation diameter of said contact surface and at least partially adjacent to the friction pad;
   wherein said carrier device is configured so that the value of the local natural angle frequency varies between front and back ends of said sector portion;
   wherein said value of the local natural angle frequency is varied as a result of a variable mass distribution along said sector portion; and
   wherein said variable mass distribution along said sector portion is a result of a waist of variable volume being provided upon a spar web along said sector portion.

18. The carrier device as recited in claim 17 further comprising:
   said value of the local natural angle frequency being varied as a result of a variable mass distribution along said sector portion and a variable bending stiffness along said sector portion.

19. The carrier device as recited in claim 18 wherein said variable bending stiffness and said variable mass distribution along said sector portion is a result of a variable height of a spar web of said carrier device.

* * * * *